United States Patent [19]

Derbyshire

[11] Patent Number: 4,794,226

[45] Date of Patent: Dec. 27, 1988

[54] SELF-REGULATING POROUS HEATER DEVICE

[75] Inventor: Rodney L. Derbyshire, Menlo Park, Calif.

[73] Assignee: Metcal, Inc., Menlo Park, Calif.

[21] Appl. No.: 917,266

[22] Filed: Oct. 8, 1986

Related U.S. Application Data

[63] Continuation of Ser. No. 498,328, May 26, 1983, abandoned.

[51] Int. Cl.⁴ .......................... F24H 1/00; H05B 6/10; B01D 35/18; B01J 19/08
[52] U.S. Cl. ...................... 219/374; 210/184; 210/222; 210/748; 219/10.75; 219/307; 219/381; 219/553; 422/189; 422/199
[58] Field of Search ............... 219/374, 381, 10.43, 219/10.49 R, 10.51, 10.75, 300, 301, 307, 552, 553; 110/216; 210/184–186, 222, 223, 497.01, 497.3, 695, 748; 422/189, 188, 191–194, 199

[56] References Cited

U.S. PATENT DOCUMENTS

| | | | |
|---|---|---|---|
| 383,536 | 5/1888 | Newman | 219/300 |
| 1,464,845 | 8/1923 | Downs et al. | 422/190 |
| 1,986,348 | 7/1935 | Lacy et al. | 422/199 |
| 2,144,340 | 1/1939 | Lazier | 260/465.2 |
| 2,512,562 | 6/1950 | Cummings | 422/192 |
| 2,532,756 | 12/1950 | Brunjes et al. | 422/191 |
| 2,560,220 | 7/1951 | Graziano | 123/549 |
| 2,727,632 | 12/1955 | Mack | 219/381 |
| 3,218,384 | 11/1965 | Shaw | 174/40 |
| 3,235,084 | 2/1966 | King et al. | |
| 3,268,080 | 8/1966 | Eberly, Jr. | 219/381 |
| 3,608,610 | 9/1971 | Greatorex | 210/185 |
| 3,811,845 | 5/1974 | Nakamura | 422/188 |
| 3,833,791 | 9/1974 | Schladitz | 219/381 |
| 3,898,295 | 8/1975 | Wanka et al. | 422/191 |
| 3,934,117 | 1/1976 | Schladitz | 219/307 |
| 3,966,783 | 6/1976 | Rozsa et al. | 556/145 |
| 3,983,360 | 9/1976 | Offermann | 219/10.51 |
| 4,019,021 | 4/1977 | Schladitz | 219/307 |
| 4,091,813 | 5/1978 | Shaw et al. | 128/303.14 |
| 4,126,430 | 11/1978 | Roberge | 422/191 |
| 4,185,632 | 1/1980 | Shaw | 128/303.1 |
| 4,256,945 | 3/1981 | Carter et al. | 219/229 |
| 4,352,730 | 10/1982 | Kijkhuis | |
| 4,456,186 | 6/1984 | Ando | 219/301 |
| 4,459,126 | 7/1984 | Krill et al. | 431/7 |

FOREIGN PATENT DOCUMENTS

| | | | |
|---|---|---|---|
| 1080291 | 6/1980 | Canada | 219/301 |
| 2432904 | 7/1974 | Fed. Rep. of Germany. | |
| 41-2677 | 4/1966 | Japan. | |
| 148752 | 12/1978 | Japan | 219/301 |
| 119408 | 9/1980 | Japan. | |
| 8203305 | 9/1982 | PCT Int'l Appl. | 219/10.75 |
| 1076772 | 7/1967 | United Kingdom. | |

OTHER PUBLICATIONS

"New Method of Preventing Ice Formation on Exposed Power Conductors", Toms et al., Proc., IEEE, vol. 112, No. 11, Nov. 1965, pp. 2, 125, etc.

Primary Examiner—A.D. Pellinen
Assistant Examiner—Geoffrey S. Evans
Attorney, Agent, or Firm—Hall, Myers & Rose

[57] ABSTRACT

A self-regulating porous heater device regulates the temperature of fluid passing through it. This device includes at least one layer of a porous material which has a magnetic permeability inversely related to temperature over a given range. Due to conductor skin effects, changes in permeability cause changes in the depth of penetration of a.c. current passing through the magnetic layer. Changes in the depth of penetration, in turn, result in changes in resistance—the less the depth the greater resistance—and in I²R Joule heat. The combined result of these effects is to provide more heat where the temperature of the fluid and the layer through which the fluid flows is below a specified temperature which is related to the Curie temperature of the layer. The device can have a laminate structure including a porous magnetic layer and at least one other magnetic layer or at least one low resistance nonmagnetic layer or a combination thereof, which may or may not be porous. By properly defining pore dimensions, the heater device can filter contaminants from a fluid as it flows therethrough. Switching between a normal operating temperature and an elevated temperature for vaporizing or burning off contaminants at the pores is provided. In a preferred mode, a porous heater device is included in a chemical reaction chamber for exothermic reactions.

10 Claims, 3 Drawing Sheets

SELF-REGULATING POROUS HEATER DEVICE

This is a continuation, of application Ser. No. 498,328, filed May 26, 1983, now abandoned.

RELATED APPLICATION

The present application is related to patent applications Ser. No. 243,777 filed on Mar. 16, 1981, now U.S. Pat. No. 4,701,587, entitled "Shielded Heating Element Having Intrinsic Temperature Control"; Ser. No. 543,443, filed Oct. 19, 1983, a continuation-in-part of Ser. No. 430,317, filed Sept. 30, 1982 Ser. No. 430,317 filed on Sept. 30, 1982, now abadoned, entitled "Auturegulating Electrically Shielded Heater"; Ser. No. 445,862 filed on Dec. 1, 1982, now U.S. Pat. No. 4,752,673, entitled "Improved Autoregulating Heater"; and Ser. No. 498,282, now abandoned, filed on May 26, 1983.

TECHNOLOGICAL CONTEXT OF THE INVENTION

Various devices and methods have been suggested over the years for controlling the temperature of a heater. Generally, such devices and methods have relied on positive temperature coefficient of resistance materials in some type of separate feedback network in which temperature variations detected by a sensor serve as input to a control system.

The major problem with techniques that rely on the positive temperature coefficient of resistance for a material is that such materials can control temperature over only a limited temperature range.

Prior techniques employing feedback networks have proved to be inappropriate in various applications—for example, in an environment where the response time is short, or where the heater must provide various amounts of heat along its cross-section, or where the addition of extra heating elements is not desired.

A heater that improves on such prior devices and methods has been proposed by Carter and Krumme in U.S. Pat. No. 4,256,945. Referred to as an autoregulating electric heater, the Carter-Krumme heater does not employ separate sensors or feedback elements. Instead, the heater temperature—which is to be regulated—directly affects the amount of heat generated by the heater.

Specifically, Carter and Krumme disclose a laminate structure in which one layer comprises a material of high magnetic permeability and a second layer comprises a low resistance, non-magnetic material. The two layers have a common interface and are in thermal and electrical contact. Connected at opposite ends along the magnetic layer is an a.c. source. The magnetic layer and non-magnetic layer are in parallel across the source.

Because of the skin effect, the application of alternating current to the magnetic layer initially results in a current path substantially confined to a depth in the magnetic layer extending inward from the surface adjacent the current return path of the circuit; i.e. opposite the interface with the low resistance layer. The depth of penetration of the current is defined by the well-known Steinmetz expression:

$$\text{skin depth} = \text{constant} \sqrt{\rho/\mu f}$$

where $\rho$ is the resistivity and $\mu$ is the magnetic permeability of the magnetic material and where f is the frequency of the current. Because the field falls off exponentially in accordance with the expression $e^{-x}$ where x=thickness/skin depth, it should be realized that approximately 63.2% of the current flows in one skin depth.

As is well known, resistance to current is proportional to $\rho/A$ where "A" is the cross-section through which current flows. Accordingly, if the skin depth is increased, the cross-section A increases and the resistance correspondingly decreases. Where the Joule heat generated by a material is equal to $I^2R$, it is noted that by increasing skin depth the area A increases; the resistance decreases; and thus the heat generated decreases.

Carter and Krumme in the above-referenced patent have coupled this relation of depth versus generated heat with their awareness of magnetic materials which have permeabilities which, at least over a range of temperatures, increase with decreasing temperatures. In particular, certain magnetic materials provide a large increase in permeability with a small decrease in temperature between two predefined temperatures (one of which may be referred to as the Curie temperature). When these certain materials undergo this small decrease in temperature, the value of the permeability greatly increases and, all other factors being equal, the depth of penetration of a major portion of the a.c. current in the material decreases. This depth of penetration is not necessarily the skin depth. Rather this depth of penetration may reflect the depth at which 95% (or some other percentage) rather than the theoretical 63.2% of the current flows. This selectable depth is inversely related to permeability, increasing with decreasing permeability. Moreover, the resistance increases resulting in an increased $I^2R$ generation of heat for a constant current passing through a device.

By combining these various effects and material properties, as discussed above, a first measure of self-regulation (or autoregulation) is achieved. That is, within the magnetic material itself, the heat generated thereby is affected by the depth of current penetration and the depth of current penetration has been shown to depend on the temperature of the magnetic material.

As taught by Carter and Krumme, a second measure of self-regulation is also achieved as the current totally penetrates the magnetic layer and follows a path that also includes the "parallel" low resistance layer. When this occurs, it is as if a constant current passes through a high resistance and a low resistance in parallel rather than through just a high resistance.

This change in resistance translates into a sharp variation in generated heat. With a constant current of I, $I^2=K$ (where K is a constant). When the current flows only through the magnetic layer of high resistance $R_1$, the corresponding value for generated heat is $KR_1$. When the current flows through along the layer of low resistance $R_2$ (where $R_2 << R_1$), the generated heat is approximately $KR_2$. The generated heat $KR_2$ is significantly lower than the heat $KR_1$. Accordingly, it is noted that as the depth of the current into the magnetic layer increases, the resistance and, hence, the generated heat decreases. In addition, as the current penetrates the low resistance layer, resistance drops even more drastically to further decrease the generated heat.

By employing the two layer laminate structure, Carter and Krumme achieved a highly effective autoregulating or self-regulating heater useful in various applications, such as soldering irons.

In addition to the teachings of U.S. Pat. No. 4,256,945, related inventons have been set forth in copending patent applications. Such inventions have pertained, inter alia, to features including: (a) the prevention of high frequency fields generated in the heater from being radiated into regions adjacent to the heater; (b) the generation of autoregulated heat with a relatively low constant current source; (c) the formation of a laminar structure of two high magnetic permeability layers one of which has a higher Curie point than the other; (d) the use of an autoregulating heater in raising the temperature of a fusible material to a condition of molten flow; and (e) the formation a laminate structure in which a low resistance layer is interposed between two magnetic layers having differing Curie temperatures.

The advances in the heating art achieved by the various inventions relating to autoregulation have been useful and significant in numerous fields of application and environments. The present invention expands the utility of these prior advances into new applications and new environments as well as providing new features and useful articles.

SUMMARY OF THE INVENTION

The present invention relates to an autoregulating heater which is porous and is used primarily in the heating of fluids.

As a porous, self-regulating heater, the present invention has the various advantages achieved in the above-mentioned autoregulating heaters. For example, the invention does not require additional, often elaborate sensors and control systems. Also, various areas along the heater can provide different levels of generated heat in response to the temperature of the heater at each such area. The generating of heat can thus be localized to effect either a uniform or a predefined variation or gradient of temperatures along the heater.

In addition, however, the present invention features uses and advantages which underscore the significance and synergistic nature of the porous self-regulating heater device of the present invention.

First, the heater of the invention can serve as a filter as well as a heater. By applying a pressure differential across the porous heater, fluid and contaminants entrained therein can be directed toward the pores. The contaminants can then be trapped and the fluid allowed to pass through. The invention, in such an embodiment, may be used to purify liquids by both filtering and heating at the same time.

A second and perhaps more notable application of such a device is in a diesel fuel line. When attempting to cold start a diesel engine, a build-up of paraffin, particularly in the fuel filter, may often prevent the flow of fuel and the starting of the engine. The present invention can alleviate such a problem. When energized, the filter-heater will generate heat, the amount of heat being related to the temperature of the heater device at each given area. Cold or solidified paraffin resting against the filter-heater is then heated in the normal operation of the filter- heater, which results in melting the paraffin. Because the heat tends to concentrate on the cold spots, the device of course realizes thermal efficiency by directing heat where it is most needed. If the heat of normal operation is insufficient, means for internally generating greater levels of heat in the device in order to melt or burn-off paraffin or contaminants may be provided by increasing frequency or current density. The significance of this invention in a fuel line for aircraft is particularly noteworthy since such a fuel line may undergo severe temperature decreases as the aircraft increases its elevation. The clogging of a fuel filter screen with ice crystals is a long known, serious problem which can be substantially alleviated by the preeent filter-heater.

A third context in which a multiple temperature heater-filter may be ueed is in oceanography. Where sea water is to be collected and/or heated as it passes through a filter, a filter may become clogged with biofouling. By heating the filter beyond a normally regulated temperature to a biocidal level, marine growth may be vaporized or burned off so that the filter can resume normal operation.

Additional uses contemplated by the invention include the purification of used motor oil and polymer stripping. It is further contemplated that a porous heater be used in separating, for example, low molecular weight amorphous polypropylene from a polypropylene polymer, amorphous polypropylene having a lower melt transition than isotactic polypropylene.

The devices of this invention can be used as porous heaters through which fluids flow; porous heaters which filter contaminants from a fluid as it flows thoough the device; porous heaters which can be fabricated to regulate fluids at several temperatures; porous heaters which heat local areas to effect either a desired uniform or a variable temperature profile across a fluid; porous heaters that can be switched between at least two temperatures, the higher of which is sufficient to remove contaminants which may be trapped at the pores; or other such porous heaters and combinations thereof which feature autoregulation, or self-regulation.

The device that achieves these various ends includes at least one thermally conductive layer of a porous magnetic material that has a defined magnetic permeability ($\mu$) versus temperature (T) response wherein, at least over a given temperature range, $\mu$ increases as T decreases. The $\mu$ versus T response is a function of the magnetic material employed and the magnetic field to which the layer is exposed. That is to say that over a predefined temperature range, the variation in $\mu$ may also be considerably affected by changing the magnetic field. It is preferred that the change of permeability over the predefined temperature range be large in order to enhance the regulation of temperature.

In the absence of fluid the device autoregulates at a prescribed temperature. As fluid comes in contact with such a magnetic layer, the fluid comes in thermal equilibrium with the surface of the layer where contact is made. That area of contact decreases in temperature in response to fluid temperature below the autoregulating temperature and (assuming the temperature variation is within the given range) the value of $\mu$ will increase. As $\mu$ increases, the skin depth, which represents the depth of current penetration, decreases, resulting in a decrease in current cross-section and an increase in resistance. When a constant a.c. current is applied across two spaced points on the magnetic layer, the decrease in temperature which leads to an increase in resistance results in an appreciable increase in heat generation. That is, the devices of this invention generate more heat when in contact with lower temperature fluids than with higher temperature fluids over the self-regulating temperature range of the heater. Accordingly, this simplest form of the invention permits a fluid to be heated by a heater in an authothermic, self-regulating manner as the fluid passes through it.

By adding another layer to form a laminate structure, the characteristics of the invention are further enhanced. If the added layer has a low resistance, a sharp or well defined cut off temperature can be provided, above which considerably less heat energy is transferred to the fluid. In such an embodiment, current is normally and substantially confined to the skin depth or some other defined depth of penetration of current in the magnetic layer. When the thermal equilibrium induced in the magnetic layer is high, the permeability $\mu$ is correspondingly low, resulting in a large depth of penetration. If the depth of penetration becomes larger than the thickness of the magnetic layer, substantial current then also passes through the low resitance, added layer. Once current flow enters this added layer, the heat generated is drastically reduced. That is, where the "parallel" resistance of the added layer is relatively small, $I^2R$ heat is greatly diminished. Hence, at and above the temperature at which the depth of penetration exceeds the thickness of the magnetic layer, comparatively little heat is generated. In this embodiment, the heater assures that the temperature of the fluid (at least over a given range) is raised to at least at a predefined minimum level.

A third alternative embodiment or device includes at least two magnetic layers that form a laminate structure, each layer having different $\mu$ versus T response. In this embodiment, different fluid temperatures produce different relative responses. Within a single layer, it is recalled, the change in skin depth with respect to temperature depends on changes mainly in $\mu$ (the resistivity of the single layer remaining substantially relatively constant). In this laminate device, when an a.c. current penetrates the first layer and enters a second layer, however, the permeability and resistivity of the second layer also affect the heat generated. If the second layer has the same resistivity and a higher permeability than the first layer at a specific temperature, the depth of this added current penetration into the second layer is smaller than if the current was to penetrate further into material of the first layer. A gradient in the heat generation profile thus results as the current penetrates the second layer. If the second layer differs in resistivity as well, the heat generation profile may also exhibit a calculable—although more complicated—gradient. Moreover, by stacking more than two magnetic layers to form a laminate structure, various heat generation gradients may result corresponding to determined temperature ranges.

A fourth embodiment of the heater which can also vary the heat generation response includes at least one magnetic layer having a thickness, resistivity, or magnetic permeability that varies at different areas within the device. In this embodiment, it is envisioned that the thickness of the magnetic layer may gradually increase from one end of the magnetic layer toward the other. The effect of this change in thickness is readily noted if a low resistance layer of uniform thickness is laminated to one surface of the magnetic layer and a constant a.c. current applied to the magnetic layer. The temperature required for the current to penetrate the magnetic layer and to substantially cut off heat generation thus varies from one end of the magnetic layer to the other. This embodiment can serve to permit a fluid to pass through the device while effecting a progressive thermal gradient across the fluid cross-section.

The heating devices of this invention may comprise flat, cylindrical, conical or other such structural configurations comprising at least one porous layer or a plurality of laminated, porous layers. Accordingly, the invention may be shaped for use as a fuel filter-heater, or a hot air gun to precisely heat a given flow rate of gas, or a chemical reaction chamber in which reactants and flow rate can be precisely controlled as to temperature, or a fractionation or stripping column for polymers.

In addition, since the heater itself is an integral structure, removal and replacement from a support structure can be simplified.

A further mode of this invention contemplates the heating of a fluid that is electrically conductive, wherein such fluid passes through at least one porous layer of thermally conductive material encircled by a nonporous magnetic, thermally conductive layer. An a.c. current is supplied so that it follows a path about the outer surface of the encircling magnetic layer. When the encircling magnetic layer is below a given temperature, the current is confined to a narrow depth and significant heat is directed to the fluid passing through the porous inner layer or layers. When the encircling layer exceeds the given temperature, the a.c. current spreads inwardly. When the current reaches the conductive fluid, the resistance and the related $I^2R$ heat drop. Thermal control is thereby achieved. In addition, it is noted that the magnetic layer may be encircled, rather than encircle, the porous layer. That is, a.c. current may then move outwardly from the inner surface of an encircled magnetic layer until it reaches the conductive fluid, whereat the generation of heat drops. The employment of either or both an encircling and an encircled magnetic layer may be provided.

In considering these various embodiments, it is noted that there may be limiting factors such as (a) materials and temperature ranges which must be used; (b) contaminants which do not vaporize or burn off in the heater-filter embodiments; (c) flow rate limits (although the invention may be designed to regulate fluid temperature over a wide range of flow rates); and (d) the thermal conductivity of different layers and fluids. In practicing the various embodiments and realizing the sundry advantages and benefits of this invention, these factors should be considered.

In any case, regardless of the embodiment, it is preferred that the maximum heat obtained at a minimum power, or maximum $I^2R$ heat, be transferred to a fluid. Specifically, it is preferred that the heater device provide several times more heat to the fluid when cold and thus requiring maximum heating rather than to attempt to heat a fluid above a desired level at which little or no heat is required. Proper selection of the material of construction of the heating device can achieve this end.

One significant application for the heating devices of this invention is in the area of chemical reaction chambers.

In a number of chemical reactions, tight and strict control of the variables in the equation $PV = nRT$ is of significance. Specifically, in the disciplines of polymer synthesis, of organic and inorganic chemistry, and of biochemistry, there are reactions in which temperature (as well as other variables) must be closely controlled. By proper selection of chamber dimensions and flow rates, together with the employment of heating devices taught herein, exquisite and explicit control of reaction conditions can be attained.

Controlled reaction chambers are used in industrial applications. Reactions such as large-scale polymerization may be practiced simply and economically when both polymer molecular weight and molecular weight distribution can be controlled and reaction yields maximized. Such polymerization reactions include, but are not limited to, free radical initiated, chain propagation reaction polymerization and stepwise condensation reaction polymerization. By way of example, polymer classes formed by the former type of polymerization include: 1-polyolefins, poly vinyl halides, polyaromatics, polyalkyl methacrylates, polyacrylonitrile, and the like. Examples of the latter type of polymerization include: polyepoxy resins, phenol-formaldehyde resins, polyamides, polyesters, Urea-formaldehyde resins, etc. Silicone polymers represent yet another example of a material that may be manufactured using the heating devices of this invention. Furthermore, controlled copolymerization, alternating copolymerization, block co-polymerization and polymer grafting may employ these porous heating devices.

Large-scale industrial applications obviously would involve the use of large reaction units and large heaters; however, the present invention may be employed on smaller scales as well. Such smaller units would find use in organic and in biochemical synthesis.

Reaction chambers made using heaters of this invention can feature multiple zones of tightly controlled temperature, as well as pressure, volume, and concentration control. As a result, most any endothermic or exothermic reaction may be carried out resulting in nearly complete reactions and consequently excellent yields by merely selecting optimal reaction conditions.

One or more reaction heating zones may be employed in a serial manner in order to sustain biochemical synthesis. Specific amino acid chains, proteins, polysachamides, nucleic acid chains, and the like may be produced b arranging the heating zones (or portions thereof) serially with sequential feedstock inputs.

In a preferred embodiment, a reaction chamber would include a heater device that extends entirely along the path length of flow through the chamber. By forming the heater device either as (a) a single layer of alloy having varied permeability versus temperature response along the direction of flow or as (b) a plurality of stacked layers, different levels of heat may be imparted at various locations along the length of the chamber. For example, two reactants A and B may be combined at a first location along the chamber with a heater device raising both reactants to a temperature $T_I$ as they combine to form a mixture M. As mixture M flows through the chamber, it may be raised nn temperature by the single or multiple layers of the heater device. At a second location along the chamber at which the mixture M reaches a temperature $T_{II}$, a third reactant C may be entered to combine with the mixture M. This serial combining or mixing may be necessary since reactant C must be kept at a temperature above $T_I$ or since reactants A and B may combine optimally at $T_I$, with their resultant mixture M combining optimally with reactant C at temperature $T_{II}$ to promote a chemical reaction. Thus reaction chambers based on heating devices of this invention permit tightly controlled temperature regulation of fluids therein before, during and after a reaction occurs. The term "fluid", it is noted, includes liquids, gases, mixtures, suspensions, powders, and generally any substance that will flow under sufficient heat and pressure.

To enhance the temperature control and safety aspects of such reactions chambers, zones of cooling,—preferably constant cooling,—can also be provided. The cooling zone, if needed or desired, extracts heat from the chamber along at least part of the chamber length. Together with the heater devices, cooling zones permit even tighter thermal control over a reaction than can be achieved with more traditional methods.

The pairing of a cooling zone and a heater device may be needed when an exothermic reaction is to be considered. The heater device may raise the temperature of reactant E to $T_{III}$ and then combine E with a reactant F already at temperature $T_{III}$ to yield product N plus heat. Where the heat generated is of an excessive level, two effects occur to reduce the heat level. First, the heater itself automatically,—by self-regulation,—curtails the heat transferred to a minimal level. Second, the cooling zone withdraws heat from the reaction stream. In addition, the cooling zone can withdraw sufficient heat to prevent serious overheating. If necessary, a catalyst coating can be provided within the interior of the chamber to promote a desired reaction.

DESCRIPTION OF THE INVENTION

Figure 1:
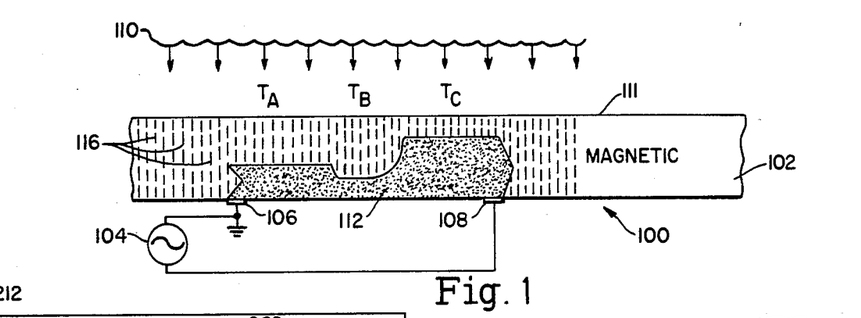
FIG. 1 is a side-view illustration showing one embodiment of a self-regulating fluid heating device comprising a single porous layer of magnetic material.

Referring to FIG. 1, a heater device 100 is shown comprising of a single layer 102 which is made of a porous, thermally conductive material having a magnetic permeability which, over a given tmmperature range, decreases with increasing temperature. Such a material preferably has a relatively high effective permeability ($\mu \geq 200$) below a first given temperature ($T_1$) and a permeability of approximately one ($\mu \approx 1$) above a second higher given temperature ($T_2$), where $T_2 > T_1$. As the temperature of the layer 102 drops in the range between the second temperature ($T_2$) and the first temperature ($T_1$), the permeability increases. When the material of construction of layer 102 is selected such that its resistivity does not undergo any appreciable change over the given temperature range ($T_2-T_1$), a change in permeabiltty results in a change in skin depth. This fact is readily recognized when one notes the definition of skin depth (S.D.):

$$S.D. = 5030 \sqrt{\rho/\mu fcm} . \quad (1)$$

where and are the resistivity and permeability of a material through which an a.c. current at the frequency f passes. With the frequency f and the resistivity p maintained constant, the skin depth becomes solely dependent on changes in the permeability of the material. More specifically, under these conditions:

$$S.D. \, \alpha \, 1/\sqrt{\mu} \quad (2)$$

Accordingly, as temperatures increase (within the given range), permeability $\mu$ decreases and the skin depth increases.

Because the current density falls off at a rate equal oo $e^{(-t/S.D.)}$, where t is the thickness being considered, it is noted that all but $(1-1/e) \times 100\%$ of the current is theoretically confined to a skin depth. In this description, the term "depth of penetration" of the current is used to represent that thickness beyond which no substantial current flows. This depth of penetration may equal one skin depth or some other thickness at which a predefined theoretical percentage of current flows. When the depth of penetration is the skin depth, expression (1) applies. Where the depth of penetration is other than skin depth, expression (1) would require some minor modification although the general principles would remain the same.

This change in the depth of penetration beyond which no significant current passes takes on special meaning when a.c. current is, in fact, applied to the layer 102 by a source 104 connected to two points 106 and 108. The contact points 106 and 108, it is noted, may be located on either surface of the layer 102 with a similar effect being achieved.

As shown in FIG. 1, a fluid 110 flows against the layer 102. The temperature of the fluid 110 varies at different areas along the layer. Along one area on the surface 111 of the layer 102, the temperature of the fluid 110 is $T_A$; at another area the temperature of the fluid 110 is $T_B$; and at a third area the temperature of the fluid 110 is $T_C$. The temperature $T_B$ is lower than temperature $T_A$ which, in turn, is lower than temperature $T_C$, i.e. $T_B < T_A < T_C$. Because the resistivity $\rho$ of the layer is considered constant and the frequency f of the a.c. current is held constant, the depth of penetration of the current, represented by the shaded portion 112, varies with the temperature-induced changes in permeability of the material as reflected in the permeability $\mu$ versus temperature response curve for the given magnetic material. That is, where the fluid 100 induces the low temperature $T_B$ in the layer 102, the permeability remains high and the depth of penetration remains low. Similarly, where the higher temperature $T_A$ is induced in a different area of the layer 102, the permeability is correspondingly less and the depth of penetration is greater. At the highest temperature $T_C$, the permeability is even lower and the depth of current penetration even greater.

These variations of the depth of current penetration with variations in the fluid temperature represents one basic aspect of a self-regulating heater. In this regard, it is recognized that the resistance (R) to a current (I) is a function of the cross-sectional area (A) through which the current flow is confined. Specifically, resistance is inversely proportional to A. The cross-sectional area A is approximately equal to the width (transverse to current flow) multiplied by the depth of penetration. Hence, as shown by the following expressions, a decrease (increase) in depth of penetration causes a decrease (increase in area A, which results in increased (decreased) resistance. For a current I of constant frequency, the value of $I^2R$—Joule heat—transferred by the layer 102 to the fluid is greater where the fluid temperature is low and less where the fluid temeerature is high.

In FIG. 1, resistance R is large where the temperature $T_B$ is low and the depth of current penetration is small. At this area, the Joule heat provided to the fluid 110 is relatively large. On the other hand, where the temperature is high at $T_C$, the depth of current penetration is great, the resistance is relatively low, and the Joule heat generated and transferred to the fluid 110 is relatively low.

Accordingly, with reference to FIG. 1, it is observed that the heating can be localized within layer 102 to provide heat as required to raise the temperature at cold spots while providing little heat where it is not required.

Finally, with regard to FIG. 1, it is noted that the layer 102 is porous. The pores 116 permit the fluid 110 to flow through the layer 102. This aspect is significant not in providing a flow-through heater that is self-regulating; but by properly dimensioning the pores 116, contaminants entrained in the fluid 110 can be entrapped. The heater device 100 thereby also serves as a filter.

The same layer 102 thus (a) senses the fluid temperature, (b) automatically provides heat to the fluid 110 in accordance with where it is needed, and (c) filters the fluid 110 as it flows through the layer 102 if so desired.

In the FIG. 1 embodiment, it is noted that the return path is located opposite the surface 111 which first comes in contact with the fluid 110. Alternatively, the return path in this single layer embodiment may be positioned on the same side of the layer 102 as the fluid 110 itself. According to this alternative embodiment, the surface 111 closest to the fluid 110 is directly heated with portions away from the surface 111 being heated by conduction and to a lesser degree. Hence, although both techniques achieve the desired heating, this latter embodiment is more efficient.

It should be recognized that the principles underlying the operation of the device in FIG. 1 also apply, for the most part, to the subsequent embodiments which are discussed below. In this regard, however, it will be noted that the location of the ground return path is generally not optional as in the FIG. 1 device.

Figure 2A:
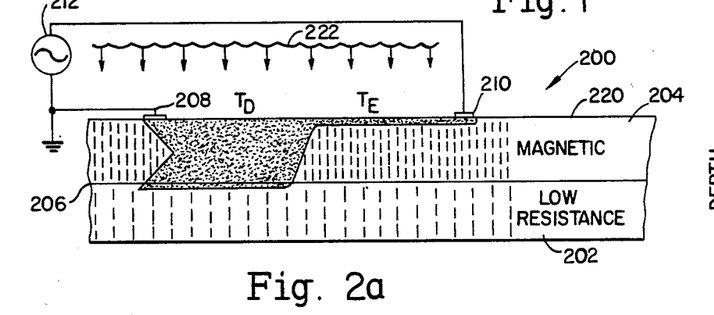
FIG. 2(a) is a side-view illustration showing another embodiment of a self-regulating fluid heating device comprising two porous layers, one being magnetic and one being low resistance and nonmagnetic.

Turning now to FIG. 2(a), a two layer embodiment of a heater device 200 according to this invention is shown. The first layer 202 is made of a low resistance, preferably porous, material. The second layer 204 is porous, thermally conductive, and magnetic. That is, the second layer 204 has a relatively high permeability below a first given temperature ($T_1$), and a permeability of approximately one above a second given temperature ($T_2$, where $T_2 > T_1$). (The second given temperature may be referred to as the Curie point). As discussed relative to FIG. 1, the material of layer 204 has a permeability which is inversely related to temperature between the first ($T_1$) and second ($T_2$) given temperatures. The material of layer 204 is also of high resistivity relative to layer 202. The thickness of the low resistivity layer 204 is preferably on the order of one to two skin depths. Layer 202 is laminated to layer 204 to form an interface 206 between them. The layers 202 and 204 are thereby in physical as well as electrical contact.

Connected at two points 208 and 210 on surface 220 of the layer 204 are leads from a source 212, which applies an a.c. current. The current follows a path the depth of which is measured from the surface 220 of the layer 204; that is the surface opposite the interface 206. When the temperature of a fluid 222 is at relatively low ($T_E$), the depth of penetration of the current is small. However, when the temperature of the fluid 222 is at a high $T_D$, the depth of penetration is large ($T_D \gg T_E$). In fact, the current totally penetrates the magnetic layer 204 and enters the low resistance layer 202. Along this portion of the current path, the two layers appear to be electrically in parallel. Because the layer 202 has low resistance, the parallel combination also has low resistance. The Joule heat generated (where $I^2$ is constant) thus almost completely drops off because of this severe change in resistance. Hence, where the temperature of the fluid 222 is $T_E$, much Joule heat is generated, whereas little heat is generated where the temperature of the fluid 222 is $T_D$.

Figure 2B:
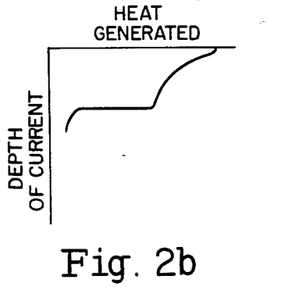
FIG. 2(b) illustrates the sharp break in heat generated versus depth of current penetration attainable with such a two layer heating device.

In the FIG. 2 embodiment, two effects contribute to self-regulation. First, as in FIG. 1, an inceeased depth of penetration of current into the layer 204 from surface 220: results in decreased resistance and Joule heat. In addition, however, when the current enters layer 202, the resistance drops drastically resulting in a corresponding drop in heat generation. This dual effect is depicted in FIG. 2 (b) which graphically shows how the generated heat (a) is at a maximum where the depth of current penetration is the least; (b) gradually decreases as the depth of penetration increases; and (c) drops to a minimum when the current enters the low resistivity layer 202. The graph, FIG. 2(b), is provided to show general relationships and is not intended to set forth precise, quantitative relationship betwee the heat generated and the depth of current penetration.

In this regard, the thickness of the layer 204 is defined so that as a predefined temperature $T_1$, e.g. the Curie point for the material of composition of layer 204, the current totally penetrates layer 204 and enters layer 202. That is, at the temperature $T_1$, the depth of penetration exceeds the thickness of the layer 204. Layer 204 is preferably one or several skin depths thick and may be defined as desired.

As with the FIG. 1 embodiment, the heater device 200 can also function as a filter as well as a self-regulating, flowthrough heater. To achieve filtration, the pores in layer 202 or layer 204 or both may be small enough to trap contaminants entrained in the fluid 222. Currently, there are sintered bronze and other porous metal filters. Such filters may comprise the low resistance layer 202 and may be laminated to a magnetic layer 204. The layer 202 in such case would already have an appropriate porosity for a given end use. The magnetic layer 204 should have pores that are preferably greater than or equal to the size of the pores in the layer 202 since contaminated and cool fluid would first come in contact with layer 204.

Whether used in a heater-filter application or not, there may be a problem with particles clogging the pores of the heating devices 100 or 200. To address this problem this invention further contemplates a multi-level heating feature in which a device can be operated at any of several selectable, self-regulating temperatures.

Figures 3, 4:
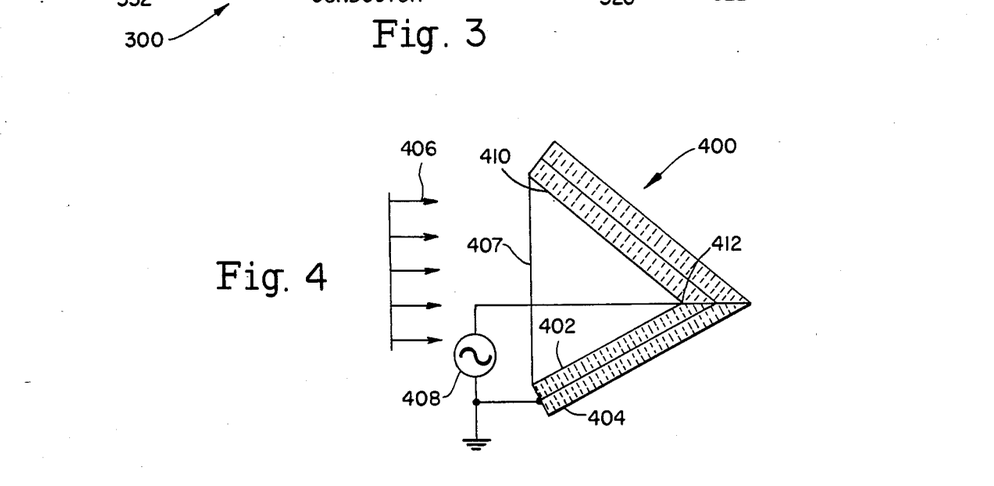
FIG. 3 is a side-view illustration showing another embodiment of a self-regulating fluid heating device comprising three porous layers, namely one low resistance nonmagnetic layer sanwiched between two magnetic layers.
FIG. 4 is a side-view illustration showing another embodiment of a self-regulating fluid heating device comprising at least two magnetic layers of conical shape.

A dual-level heating device 300 is shown in FIG. 3. The device 300 has a laminate structure which permits the device 300 to effect heating at two different levels. Specifically a low resistance, thermally conductive layer 302 is sandwiched between two magnetic layers 304 and 306. Coupled to each magnetic layer 304 and 306 is a respective contact 310 and 314. Either contact 310 or 314 is selectively connected to one terminal of a two-terminal source of current 316 by the action of a switch 318. The switch 318 also selectively connects the other terminal of the source 316 to a contact 320 or 322. Contact 320 is connected to an electrical conductor layer 324; contact 322 is connected to an electrical conductor layer 326. Sandwiched between the conductor layer 324 and the magnetic layer 304, is an electrical insulator layer 330. Similarly, sandwiched between the conductor layer 326 and the magnetic layer 306 is an electrical insulator layer 332. The switch 318 in a first (up) position creates a current path through contact 310, magnetic layer 304, insulator layer 330, conductor layer 324, and contact 320. In this switch position current penetrates a thin depth of the magnetic layer 304 proximate the interface with the insulator layer 330 when the temperature of the magnetic layer 304 is low. When the temperature is high, the depth of penetration increases, eventually reaching the low resistance layer 302 which results in a substantially cut-off of heating. Moving the switch 318 to a second (down) position creates an alternate current path through contact 314; layers 306, 332, and 326; and contact 322. By choosing the materials of construction of layers 304 and 306 with the appropriate resistivities and permeabilities, the switching of the a.c. source 316 to one of the layers (e.g. 304) can result in considerably more heat being generated than if the source 316 were connected to the other layer (e.g. 306). The level at which less heat is generated may represent the normal operating level for raising a fluid to a desired temperature. The level at which greater heat is generated may represent a level at which elements which clog the pores and must be removed either vaporize or burn-off. By switching the source 316 to one set of contacts, the fluid heating level is achieved; by switching the source to the other pair of contacts, unclogging is performed by pyrolyzing contaminants. This dual-level embodiment would be particularly useful where organic fouling or contaminants (such as biofouling in an oceanographic context or paraffin in a diesel filter context) are to be removed from the pores.

By way of example, assume that the two magnetic layers 304 and 306 have the same resistivity, but layer 304 has an effective permeability of 1000. The skin depth of layer 304 is proportional to $1/\sqrt{200}$ whereas the skin depth of layer 306 is proportional to $1/\sqrt{1000}$. When switched to the contacts 312 and 314 (on layer 306) the a.c. current encounters high resistance resulting in large $I^2R$ heat generation. This heat is conducted throughout the laminate structure of device 300 and is preferably sufficient to vaporize or burn-off the removable elements deposited on the pores of any of the layers 302, 304 and 306. When connected back between contacts 308 and 310 (on layer 304), the current encounters less resistance and sufficient heat is provided to only raise the temperature of the fluid. As in the FIG. 2(a) mode, the heat is substantially reduced if the depth of penetration totally penetrates either magnetic layer 304 or 306 and enters the low resistivity layer 302.

A similar multi-level thermal effect is achievable in the FIG. 1 embodiment by stacking a layer of a second magnttic material, with differing resistivity and/or permeability characteristics, against it. Two pairs of contacts would likewise be provided to switch the current between the alternative paths. One path or layer would provide sufficient heat for raising the fluid temperature; the other path or layer would generate enough heat to burn off or vaporize the clogging contaminants.

FIG. 4 illustrates a conically-shaped heater device 400 that has an inner porous magnetic layer 402 of conical shape against and within an outer porous magnetic layer 404 also of conical shape. Fluid 406 flows into the large diameter opening 407 of the device 400 and toward the apex 412 of the cone of the device 400. An a.c. current source 408 is connected to substantially confine current to a narrow depth along the inner surface 410 of layer 402 of the device 400 when the temperature of the fluid 406 at a given area on the device 400 is below a desired level. When the fluid 406 at an area within the cone is at or above the desired temperature, the depth of current penetration is great. As a result, resistivity is reduced and $I^2R$ heating diminished.

It is notable that in the FIG. 4 embodiment heat is concentrated at the apex 412 of the device 400. This effect is due to an increase in resistance as the apex 412 is approached. Resistance, as previously noted, is inversely proportional to the cross-sectional area A through which current flows. The area A is equal to (depth of current penetration) X (width of current path). It is observed that for a conical element the width of the current path corresponds to the circumference. As the circumference decreases toward the apex 412, the area A decreases and resistance tends to increase.

Hence, at low temperatures where the permeability of layer 402 remains at a high effective level, the application of a.c. current to the layer 402 results in a large concentration of heat being provided at the apex 412.

When used as a filter, such as in a diesel fuel filter, this feature of this invention is particularly significant. If fuel, for example, is contained by the device 400 at a low temperature before an a.c. current from the source 408 is applied, the device 400 may be clogged with paraffin or the like. When the a.c. current is switched on, heat is concentrated at the apex 412 which will melt the paraffin next to it. Fuel is then able to at least flow through the apex 412 and easier diesel start-up is achieved. Heat spreads out to other regions on the device 400 away from the apex 412.

As the fluid approaches a desired temperature, the inverse relationship between $\mu$ and T dominates and autoregulation over a given temperature range is achieved. That is, the depth of current penetration varies with changes in permeability $\mu$ to thereby affect the heat generated at each area of the device 400.

Still referring to FIG. 4, it is noted that the conical shape is similarly applicable to embodiments generally suggested in FIGS. 1, 2 and 3, such as an embodiment comprising a single porous magnetic layer of a conical shape or an embodiment comprising a porous magnetic layer and a porous low resistance layer shaped and positioned to form a conical, laminate structure. The principles of (a) concentrating heat at the apex, especially at temperatures well below a desired level, and (b) autoregulating at or near the desired temperature still apply.

Figure 5:
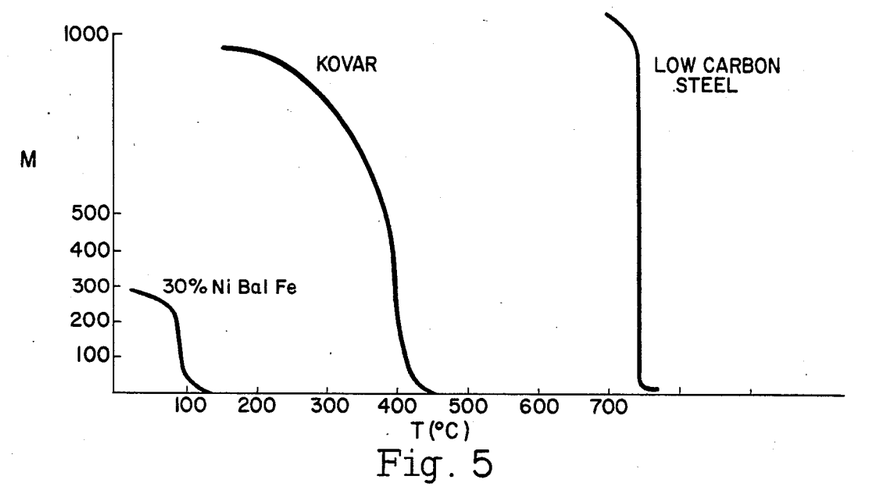
FIG. 5 illustrates the dependence of permeability, $\mu$, on temperature, T, for different materials.

Referring now to FIG. 5, the permeability versus temperature response for several magnetic materials which may be used as magnetic layers in the present invention are shown. This graph shows how the permeability ($\mu$) for these various materials is inversely related to temperature (T) over a given range; that is, $\mu$ increases when T decreses. The graph, FIG. 5, may be supplemented with similar curves for other magnetic materials shown in the following Table 1.

TABLE 1

| MAGNETIC MATERIAL | CURIE POINT | RESISTIVITY $\rho$ | EFFECTIVE PERMEABILITY* |
|---|---|---|---|
| 30% Ni 70% Fe | 100° C. | $80 \times 10^{-6}$ | 100–300 |
| 36% Ni 64% Fe | 279° C. | $82 \times 10^{-6}$ | 100–300 |
| 42% Ni 58% Fe | 325° C. | $71 \times 10^{-6}$ | 200–400 |
| 46% Ni 54% Fe | 460° C. | $46 \times 10^{-6}$ | 200–400 |
| 52% Ni 48% Fe | 565° C. | $43 \times 10^{-6}$ | 200–400 |
| 80% Ni 20% Fe | 460° C. | $58 \times 10^{-6}$ | 400–1000 |
| Kovar | 435° C. | $49 \times 10^{-6}$ | 400–1000 |
| Low Carbon Steel | 760° C. | $10 \times 10^{-6}$ | >1000 |
| Cobalt | 1120° C. | $9.8 \times 10^{-6}$ | >1000 |
| Nickel | 353° C. | $6.8 \times 10^{-6}$ | >500 |

*below Curie point

As noted in Table 1, these materials vary in Curie point, resistivity, and effective permeability (at temperatures below the Curie point). The choice of materials of construction for use in the embodiments set forth in FIGS. 1, 2(a), 3, and 4 can provide the sundry properties and characteristics needed in tailoring the heater device to a particular application.

Figure 6:
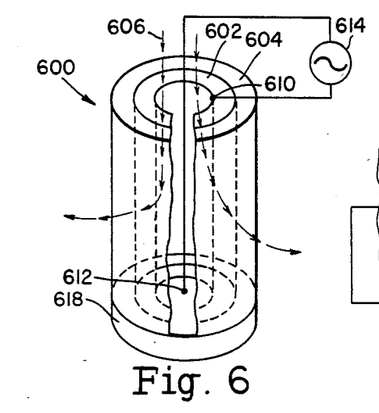
FIG. 6 is top-front perspective of a tubular embodiment of a heating device of this invention.

FIG. 6 illustrates a cylindrical or tubular structure device 600. This device 600 is particularly amenable to use as a filter, such as a diesel fuel filter. The device 600 is shown having two concentric cylindrical porous layers 602 and 604 laminated as in the two layer embodiment of FIG. 2. A solid end plug 618 forces the fluid 606 to flow, through the pores of the layers 602 and 604. As in FIG. 2, layer 602 is of magnetic material as described above and layer 604 is a low resistance material, such as porous copper or bronze. Fluid, shown by arrows 606, flows through the device 600 and is heated and, optinnally, filtered at the same time. The heating is achieved by a.c. current which passes between contacts 610 and 612 from a source 614.

The contacts 610 and 612 are preferably, but not necessarily, located as shown in FIG. 6 attached to the magnetic layer 602. In this regard, a.c. current follows a path along the inner surface of layer 602 between the contacts 610 and 612. The a.c. current is confined in depth of current penetration due to the skin effect.

As previously discussed, the two layers 602 and 604 provide the two effects of a self-regulating heater. If the temperature of the fluid is at the autoregulating temperature and the permeability, $\mu$, is low, the depth of current penetration extends from the inner surface of layer 602 outward into layer 604. Under this set of conditions, little heat is transferred to the fluid 606. If the fluid 606 falls to a temperature below the desired temperature, e.g. Curie point of the material of layer 602, the current recedes from the layer 604 and follows a narrower path within the layer 602 itself. As the skin depth decreases, both the effect of decreased depth and the effect of current receding from the layer 604 cause increased resistance and thus increaeed heating. To force fluid 606 through the device 600 to effect heating and filtering, a pressure differential is provided by conventional means, e.g. a pump, gravity, etc.

Figure 7:
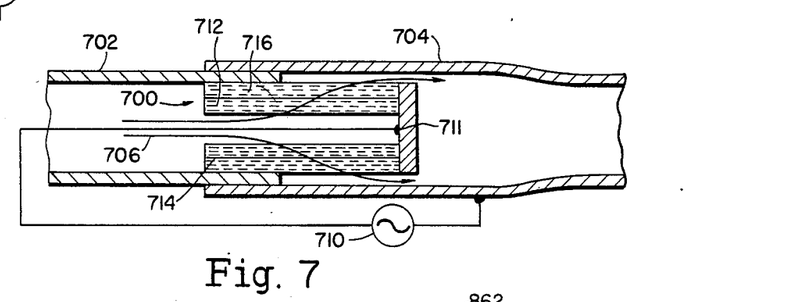
FIG. 7 is a cutaway view of a heater-filter made according to this invention, used in a fuel line environment.

In FIG. 7, a tuuular device 700 like that of FIG. 6 is shown in a fuel line. The fuel line has an inner tube 702 coupled to a larger overlapping tube 704. The fuel shown by arrows 706 passes through the pores in the device 700. Self-regulated heating is, again, affected by sending an a.c. current from source 710 to the tubular device 700 so tha current normally travels mainly along the surface 711 of a magnetic layer 712 that is opposite the interface 714 between the magnetic layer 712 and a low resistance layer 716. At higher temperatures, a.c. current spreads outward and into layer 716, resulting in little heat generation.

With regard to FIG. 7, it should be realized that the device 700 may serve as a heating device and as an optional filter with the pressure differential in the opposite direction as well. That is, fluid forced from tube 704 to tube 722 would also be heated and filtered.

Figure 8:
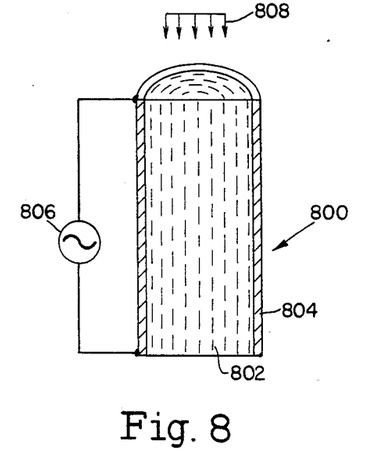
FIG. 8 is a side-view illustration of another embodiment of a self-regulating fluid heating device having a magnetic layer with a conductive fluid forming a low resistance "layer" against it.

Reference is now made to FIG. 8 in which a cylindrical heater device 800 is shown having a porous cylnndrical layer 802 encircled by a solid tubular magnetic layer 804. An a.c. source 806 is connected so that current flows along the outer surface of solid magnetic layer 804. As the temperture decreases, current spreads inwardly and eventually enters the cylindrical porous inner layer 802.

By passing an electrically conductive fluid 808 through the layer 802, the layer 802 acts as a low resistance layer. That is, when current spreads into layer 802 with conductive fluid 808 in its pores, the current follows a low resistance path through the fluid 808 and along the outer surface of layer 802. If the layer 802 is also low resistance, the layer 802 with conductive fluid 808 flowing through it simulates a solid layer for purposes of heat generation and transfer.

Figure 9:
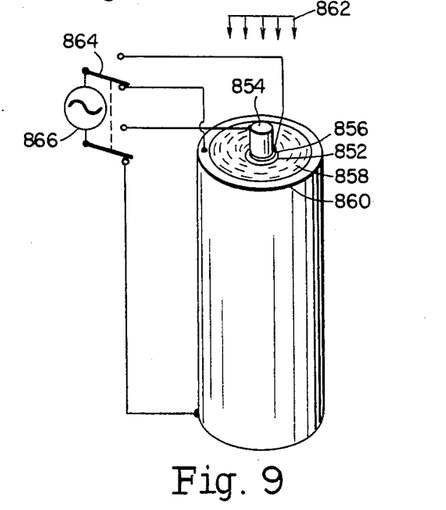
FIG. 9 is a front-top perspective of a cylindrical dual-temperature heating device.

Similar to FIG. 8 it should be recognized that a dual-temperature device 850 based on FIG. 3 may be readily envisioned as shown in FIG. 9. In FIG. 9, a tubular nonporous magnetic layer 852 encircles a cylindrical electrical conductor 854 with a tubular electrical insulator 856 being interposed therebetween. Coaxial with and encircling this magnetic layer 852 is a porous layer 858. Coaxial with and encircling the porous layer 858 is an outer nonporous magnetic layer 860 which, preferably, has a different permeability and, optionally, resistivity response relative to temperature than layer 852. The porous layer 858 is preferably of low resistance but, in any case, becomes low resistance an an electrically conductive fluid 862 flows through it. The porous layer 858 is in contact with the inner magnetic layer 852 and with the outer magnetic layer 860 to permit electrical and thermal conduction between them. Because of their proximity, layers 852, 858, and 860 are thermally conductive.

As in FIG. 3 a switch 864 is provided to initially confine current from an a.c. source 866 to either the outer surface of layer 860—with the switch 864 in the lower position—or the inner surface of layer 852—with the switch 864 in the upper position. In either case, current spreads toward the pporous layer 858 as the depth of current penetration increases. The thickness of the porous layer 858 is preferably on the order of five skin depths—as it is also in low resistance layers of the FIG. 3 and FIG. 8 devices.

Figure 10:
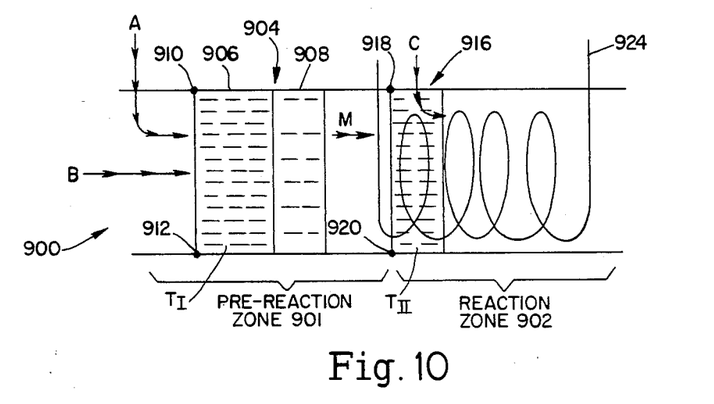
FIG. 10 is a cutaway view of one embodiment of a reaction chamber with a self-regulating heater zone within it.

Referring to FIG. 10, a reaction chamber 900 is shown. The reaction chamber 900 includes a pre-reaction zone 901 into which reactants A,B, and C are introduced and a reaction zone 902. Along a length of the pre-reaction zone 901 is a self-regulating heater 904 comprising two porous layers 906 and 908. Layer 906 is a thermally conductive, preferably high resistance magnetic material. Across points 910 and 912 an a.c. current is applied. Due to the skin effect, the a.c. current is substantially confined to a thickness defined by the above noted expression $\sqrt{\rho/\mu f}$. As the layer 906 increases in temperature (over a predefined range), the permeability $\mu$ for layer 906 decreases causing the a.c. current to spread into layer 908. In one form of the invention, the layer 908 is a thermally conductive, low resistance, nonmagnetic material. In this embodiment, the resistance heating drops off sharply when the current begins to flow through the layer 908. That is, above a temperature $T_{II}$ at which the a.c. current enters the layer 908, little heat is provided. Hence, both reactants A and B will be raised to temperature $T_{II}$, as they enter the prereaction zone 901.

As a result of normal or induced mixing, the reactants A and B combine to form a mixture M that enters the reaction zone 902 to chemically react with another reactant C which can be introduced directly into the reaction zone 902. Either or both reactants A and B can enter upstream of layer 906 or tangential to the surface of layer 906 to cause mxing. Mixture M and reactant C each flow through another heater device 916 comprised of a single porous, magnetic layer and having contacts 918 and 920 which are connected to a source (not shown). The device 916 provides more and less heat depending on how deeply a.c. current penetrates it. If the initial temperature ($T_I$) of the mixture M is too low, the depth of current penetration in layer 908 decreases or terminates and the amount of heat generated increases to raise the mixture M to temperature $T_{II}$. Reactant C is also raised to temperature $T_{II}$, which represents the optimal reaction temperature. At temperature $T_{II}$, maximum yield, for example, can be achieved.

In order to permit reactants which exceed the optimal temperature $T_{II}$ to be cooled down, cooling pipes 924 can be used to withdraw heat from the reaction zone 902.

The cooling pipes 924, or other such cooling mechanisms, serve at least two purposes. First, the cooling pipes 924 can provide constant cooling which may prevent reaction runaway or the reaction zone overheating in a highly exothermic reaction. Secondly, the cooling pipes 924 may lower the temperature in the reaction zone 902 while the heater device 91 generates heat to raise the tempeature. The combined effects of the cooling pipes 924 and heater device 916 can thus very narrowly define the temperature range in reaction zone 902 and also increase the speed of response to slight changes in reactant temperatures.

As an alternative, the layer 908 may comprise another layer of magnetic material. In this alternative embodiment, layer 906 and 908 have preferably, distinct and different $\mu$ versus T responses. Accordingly, a specific heat versus temperature profile can be defined along the length of the heater device 904.

Figure 11:
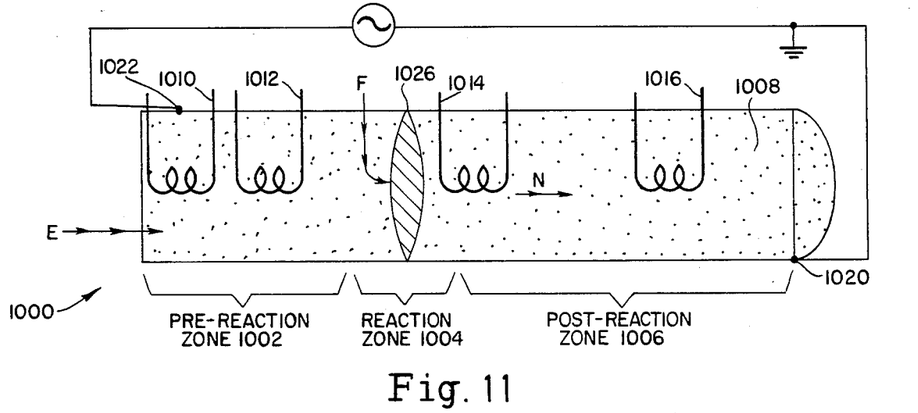
FIG. 11 is a cutaway view of another embodiment of a reaction chamber with a self-regulating heater within it.

Referring now to FIG. 11, a cylindrical reaction chamber 1000 is shown having a pre-reaction zone 1002, a reaction zone 1004, and a post-reaction zone 1006. Along the length of the chamber 1000 is an elongated, cylindrical porous layer 1008 made of a magnetic material with high permeability, $\mu$. Distributed at various locations along the length and within the chamber 1000 are cooling pipes 1010, 1012, 1014 and 1016. Each of these cooling pipes, 1010, 1012, 1014 and 1016, have separate controls.

Reactant E enters pre-reaction zone 1002 and passes through the porous layer 1008. An a.c. current is supplied to layer 1008 though contacts 1020 and 1022. The current flows along the outer surface of this cylindrical layer 1008, the depth of penetration being dependent on the value of $\mu$ at a given time and location along the layer 1008.

If the temperature of reactant E is below a desired temperature, cooling pipes 1010 and 1012 may be shut off. However, it is within the teachings of this invention that the cooling be maintained continuously. Also if the temperature of reactant E is below in desired level, the depth of current penetration along the pre-reaction zone 1002 is small—the $\mu$ versus T response for layer 1008 along the pre-reaction zone having been defined to achieve this result. The amount of Joule heat thus increases as the depth of current decreases, with heat being transferred to reactant E.

Reactant F, which may already be at a desired temperature is fed directly into the reaction zone 1004. Reactants E and F may, optionally, pass through a sheet 1026 of catalyst. Catalytic pellets, coatings, or other elements can be provided within the reaction zone to promote the desired reaction After E and F react, a product N then flows through the post reaction zone 1006.

For exothermic reactions which are to be run under tight thermal control, the embodiment in FIG. 11 is especially noteworthy. First, the cooling pipe 1014 will withdraw heat from the reaction zone 1004. Second, as the reaction zone 1004 heats up, the current will penetrate the entire layer 1008—the current will spread from the outer surface inward toward the center of the layer 1008—to minimize the generation of heat. If the diameter of the layer 1008 is large, the difference in heat generated either when the layer 1008 is barely penetrated and/or when it is totally penetrated will be large. Third, the amount of cooling is preferably gauged to the maximum heat which can be generated in the reaction.

It should also be realized that the depth of penetration may be affected by varying the composition of the layer 1008 along its length. For example, if layer 1008 is an alloy, the $\mu$ versus T characteristic along the length and/or cross-section can be varied as desired. If the alloying is varied in discrete steps along its length, a laminate structure can be simulated.

By proper selection of material along the length of layer 1008, it is contemplated that a fluid passing through the pre-reaction zone at a given temperature will be heated while a fluid passing through the reaction zone at the same given temperature will see little heating within the layer 1008.

It should be noted that the resistivity of the layer 906 and of the the layer of device 916 (in FIG. 10) and of the layer 1008 (in FIG. 11) may also affect the measure of heat generated—although to a lesser extent than permeability. In addition, the frequency f and amplitude of the a.c. current may also affect the level of heating. Finally, the magnetic field to which a magnetic material is exposed also affects the $\mu$ versus T response and thus represents another parameter for adjusting heat transfer. All of these factors may be considered in controlling the temperature of a liquid, gas, suspension, or other flowing substance passing through a reaction chamber.

Referring again to FIGS. 10 and 11, it should be realized that the pores of the layers 906, 908, 916, and/or 1008 may be dimensioned small enough to entrap contaminant particles. The filtering of such particles may not only enhance yield but may also reduce the forming of undesired by-products such as gel. To free the pores of such particles, a layer may be raised in temperature high enough to vaporize the particles or burn them off. This elevated temperature may, of course, be achieved by increasing the current amplitude or frequency, by increasing $\mu$ or otherwise increasing the resistance to current, by directing a high d.c. current across the layer, by switching the current between either of two laminated layers one of which provides more heat for a given current, or by other means.

Figure 12:
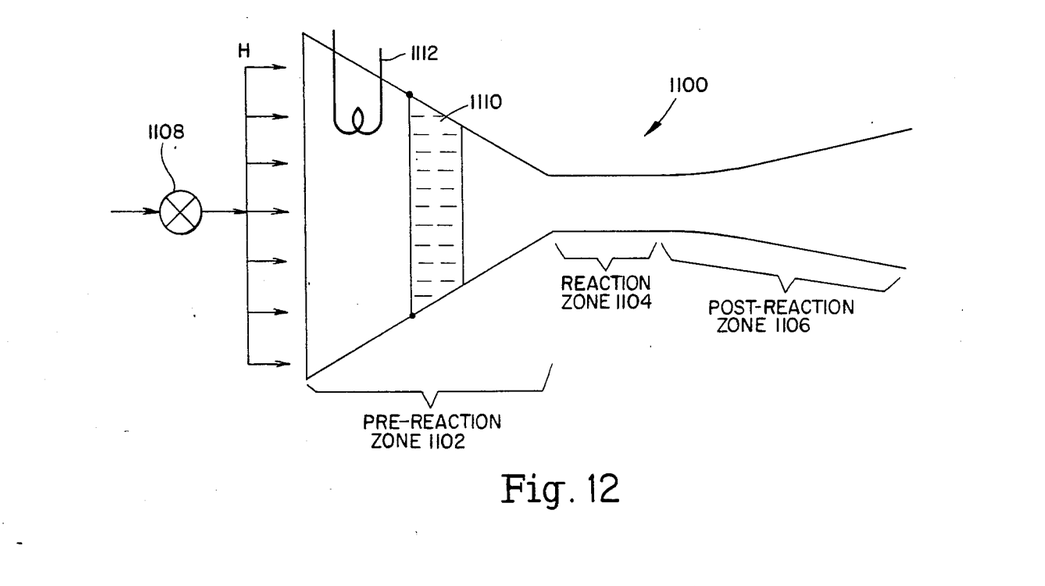
FIG. 12 is an illustration of an embodiment of a reaction chamber having self-regulating heating and controlled presence and volume.

Turning now to FIG. 12, a particularly significant aspect of this invention is depicted. A tapered reaction chamber 1100 is shown having circumference which varies along its length. The pre-reaction zone 1102 has a funnel shape the small end of which leads into the reaction zone 1104. The reaction zone 1104 has a constant cross-section which leads into a bell-shaped cross-section of the post-reaction zone 1106.

In this embodiment, a reactant H enters the pre-reaction zone 1102, the flow rate being controlled by a valve 1108. It is readily noted that the pressure and the volume of the reactant H enroute to the reaction zone 1104 is determined mainly by the dimensions of the pre-reaction zone 1102 and the flow rate of the reactant H. A heater device 1110 (comprising one or more layers as described above) is positioned within the pre-reaction zone 1102. A cooling pipe 1112 is also included within this zone. By noting that, at least for a gas:

$$PV = nRT$$

where P is pressure, V is volume, R is a constant, and T is temperature (n being moles), it is recognized that the embodiment of FIG. 12 reflects desired control over P, V, and T. Accordingly, precise control of a reaction can be achieved.

With regard to the chamber dimensions shown in FIG. 12, it should of course be realized that any of several shapes may be employed at each zone as a particular reaction may require. It should also be understood, that any and all zones may include cooling pipes or self-regulating heater devices or both as desrred.

There are of course numerous ways of controlling temperature along the length of a reaction chamber. In the prereaction zone, e.g. zone 1102 of FIG. 12, a reactant H may be either (a) lowered in temperature due to the withdrawal of heat by the cooling pipe 1112; or (b)

maintained at its entry temperature; or (c) elevated in temperature by the heater device 1110. Fluids in the reaction zone and in the post-reaction zone may similarly be lowered, maintained, or raised in temperature since cooling pipes and heater devices are included in each zone. The temperature control across the reactor need not, of course, be constant but can be varied depending on the fluid being heated, its flow rate, the dimensions of the chamber, variations in $\rho$ or $\mu$ along the chamber length, and other factors.

In accordance with the invention, reactions might include controlled temperature variations within one reactor zone. For example, a reactant J at a high temperature may be cooled along a first length of the pre-reaction zone so that it may be mixed at a certain temperature with a reactant K. The mixture may then be further elevated in temperature in the pre-reaction zone enroute to the reaction zone. Other such combinations are also contemplated and within the scope of this invention.

By way of example and not limitation, the following examples suggest how the present invention might be employed in controlling chemical reactions.

The present invention is capable of broad use in controlling chemical reactions since it permits tight control of various reaction conditions, before, during and after a reaction takes place. It is well known that some reactions use batch processing techniques; however, the present invention is more useful in continuous processing. Some polymerization reactions requiring the conditions listed have been selected as illustrative examples. Strict temperature control during and after the reaction are required for processes disclosed in: (1) U.S. Pat. No. 2,518,388 issued to Simon for urea-formaldehyde adhesives; (2) Silicon resin formation as in *Polymer Synthesis II*. Chapter 4, pg. 114, ed. Sandler, Karo; Academic Press, New York, NY (1977); (3) Poly Epoxy formation using the method of Ravey et al, J. Polym. Sci. & Polym. Chem. 12, 2821 (1974). Strict temperature controls of the pre-reaction stages are required for alkyd resins formation using the method of Martens in *Alkyl Resins*, pp. 71-73, Van Nostrand, Princeton, N.J. (1961).

Narrowly defined temperature and pressure controls must be used for the following reactions: (1) Ferrocene using the method found in *Organic Polymeric Semiconductors*, Chapt. 4, Paushkin et al ed., John Wiley & Sons, NY (1974); and (3) Block Copolymerization (tetrahydrofuran method) using the method of Saegusa et al in *Block Polymers* pg. 293 Plenum Press, N.Y. (1970).

In addition to the above embodiments, it should be noted that this invention also encompasses other aspects. First, it should be noted that skin depth and depth of current penetration are functions of current frequency as well as the resistivity and permeability of the material of construction. It is within the scope of this invention to select any of these parameters to provide additional means for decreasing the depth of current penetration to increase the heat generated for contaminant vaporization or burn-off. Similarly, the invention has suggested above that current amplitude (I) remains constant. By permitting this factor to vary in a prescribed fashion, the heat response can further be adjusted.

Second, in the Figures the various embodiments show each layer having uniform thickness and apparently uniform composition. Additional modes of this invention could provide for tapered thicknesses and/or varying the alloy compositions of a layer along the current path. By these techniques, thermal gradients may be readily produced. For example in FIG. 2 if the magnetic layer 204 were to be tapered so that it was thicker toward one end, the current would totally penetrate the less thick portion before penetrating the thicker end of the layer 204. The thicker end would still be generating considerable heat while the thinner end would generate much less, although both ends and the entire layer will still be in contact with fluid at a single given temperature. Similar effects can be achieved by varying the alloying along the layer, thereby varying the permeability versus temperature response at different areas along the current path.

Third, it should be realized that this invention suggests that a differential pressure may or may not be applied to force fluid through any of the heater devices or heater-filters. Fluid may thus, optionally, diffuse or be forced through the pores in the various layers.

Fourth, the heat generated by a device of this invention may vary between a maxmmum and minimum, the ratio of which depends on the various factors discussed above and their interrelation. Ratios minimum to maximum heat output of 6:1 or 45:1, for example, may be achieved.

Fifth, especially with regard to the device 700 of FIG. 7, it is within the scope of this invention to provide a mechanism for inserting these heating devices in other systems such as the fuel line 702. That is, the device 700, for example, may be inserted or removed from such a system by means of conventional coupling techniques.

Sixth, in embodiments employing a low resistance layer it is usually preferred that such a layer be nonmagnetic and thermally conductive although not necessarily so.

Seventh, it is noted that this invention is directed toward an autoregulating heater that is porous so that fluid can pass though it. This generic concept includes further embodiments characterized by having at least one porous layer and at least one non-porous layer, and at least one layer which is magnetic so as to provide an autoregulating effect. This effect may be achieved by passing the fluid through a porous magnetic lyyer or by passing the fluid through a porous low resistance, nonmagnetic layer in thermal contact with a porous or non-porous magnetic layer.

Eighth, according to this invention, heater device can be designed to autoregulate the temperature of a fluid so as to achieve a maximum flow rate. At or below this maximum flow rate, in other words, the heater device raises the temperature of the fluid to a desired level.

Finally, it should be recognized that features and elements of any one embodiment may be included in other embodiments. For example, dual-level temperature control for eliminating contaminants may be used with any heater which may be clogged; diffuse or pressurized fluid flow may be employed with the various embodiments; and the use of a plurality of magnetic layers with one or more low resistance layers may form a laminate structure according to this invention.

The term "ground" in the illustration of ground in the drawings although basically applicable only to a d.c. circuitry, are employed for purposes of clarifying the location of the concentration of current in the various conductors. In RF systems, a coaxial cable is normally connected between the power supply and the heater. In such circuits the so-called "ground" connection is made to the shield of the cable and the "ungrounded" connection is made to the cable center conductor.

It should be noted that preferably fluid should flow first through the layer remote from the current return path and then through the layer of ferromagnetic material adjacent the current return path. This assumed that fluid flows at a constant flow rate through the device. In the vast majority of cases the remote layer is at least two to three times thicker than the adjacent layer. Thus by flowing fluid in the recommended direction the fluid may be raised to autoregulating temperature over a greater period of time and the heat input may be less than in the case when fluid flows in the opposite direction. Finally, if such reverse flow is used, sufficient heat must be applied to raise the fluid to autoregulating temperature well before the fluid exits the adjacent layer or autoregulating cannot be achieved. The additional heat dissipates into the remote layer and may cause the fluid temperature to raise above the autoregulating temperatures in the remote (uncontrolled) layer.

Moreover, it is noted that the source of current may be an ohmic source, an inductive source or any other desired source of current at a selectable amplitude and frequency.

Other improvements, modifications and embodiments will become apparent to one of ordinary skill in the art upon review of this disclosure. Such improvements, modifications and embodiments are considered to be within the scope of this invention as defined by the following claims.

I claim:

1. In a device for uniformly heating a body of fluid to a specified temperature:
    a heating element of such extended length that one portion thereof may be cooled more than another portion,
    said heating element being composed at least partly of a ferromagnetic material having a Curie temperature at about said specified temperature,
    said heating element having holes therethrough, distributed along the length of said element, that are transverse to the direction of elongation of said element,
    means for directing said fluid through said holes, and
    means for heating said element to said specified temperature by passing an altenating current therethrough having a frequency so high that when said fluid flow lowers the temperature of one portion of the length of said element more than the fluid flow lowers the temperature of another portion of the length of said element that the skin depth of the current flow in said one portion decreases to thus increase the effective resistance of said one portion, as compared to the skin depth of the current flow in and the effective resistance of said another portion, and thus increases the heat supplied to said one portion as compared to the heat supplied to said another portion, so that the portions of the element that are subject to the greatest cooling load are provided with the greatest heating; to thereby uniformly heat said fluid to said specified temperature; said holes being of such size, distribution and density that such uniform heating of fluid is achieved.

2. In a device as defined in claim 1 in which the size density and distribution of holes provides a porous heating element.

3. In a device as defined in claim 1 in which said heating element constitutes a filter for removing contaminants from said fluid.

4. In a device as defined in claim 3: further comprising means for pyrolizing the contaminants filtered from the fluid.

5. A device for regulating the temperature of a fluid, the device comprising:
    a laminar structure having (a) a first thermally conductive layer oomprising a low resistance material and (b) a second, thermally conductive layer comprising a high resistance magnetic material the permeability $\mu_2$ of which is inversely related to temperature over a given temperature range, at least one of layers being porous and at least a portion of a porous layer being adapted to have the fluid flow in the pores thereof; and
    an interface between said first layer and said second layer which permits good electrical and thermal conduction between said first layer and said second layer,
    a third layer comprising a magnetic material having a permeability $\mu_3$ and a resistivity $\rho_3$, the third layer (a) being in electrical and thermal contact with the surface of the first layer opposite the interface; and (b) being characterized in that the resistance to current therethrough is relatively greater than the resistance to current through said second layer, under similar conditions;
    means for selectively switching the a.c. current to be applied either between (a) two points spaced along said second layer or (b) two points spaced along said third layer;
    the $I^2R$ heat generated when the current is applied between two points spaced along said third layer being greater than when switched between two points spaced along said second layer.

6. A device as in claim 5 wherein the laminar structure forms a multilayered tubular structure, the first layer encircling the second layer and the third layer encircling the first layer.

7. A device according to claim 5 wherein said third layer has a curie temperature at least as high as the burn off temperature of the contaminants contained in the fluid.

8. A device for regulating the temperature of a fluid, the device comprising:
    a laminar structure having (a) a first thermally conductive layer comprising a low resistance material and (b) a second, thermally conductive layer comprising a high resistance magnetic material the permeability $\mu_2$ of which is inversely related to temperature over a given temperature range, at least one of said llayers being porous and at least a portion of a porous layer being adapted to have the fluid flow in the pores thereof;
    an interface between said first layer and said second layer which permits good electrical and thermal conduction between said first layer and said second layer,
    means for passing constant amplitude a.c. current through said laminar structure so that the depth of penetration of a major portion of the current is measured from the surface of said second layer opposite said interface, the depth of penetration $d_2$ into said second layer being defined according to the expression:

$$d_2 \sim 1/\sqrt{\mu_2}$$

the magnitude I of the current through and the resistance R of each area on said second layer determining the quantity of $I^2R$ heat transferred to the fluid at each said area;

the quantity of heat transferred to the fluid by each such area in contact with the fluid being inversely related to the temperature of the fluid at such area over said range of temperature, thereby providing a self-regulating control of fluid temperature over said range of fluid temperatures, wherein the permeability $\mu$ of the magnetic layer varies inversely with temperature between (a) an effective permeability and (b) a permeability of substantially one, the Joule heat generated in response to the application of a constant a.c. current being at least great enough to raise the fluid to a desired autoregulation temperature when the layer has said effective permeability, wherein the fluid has contaminants therein, wherein said first layer and said second layer are porous, and wherein the fluid is forced under pressure through the pores in said first layer and in said second layer;

wherein the pores in said first layer and the pores in said second layer are sufficiently small to prevent the flowing of contaminants therethrough;

said laminar structure thereby filtering contaminants from the fluid, wherein the magnetic layer along the path of current provides differing resistances and levels of heat generation therealong when all areas therealong are subjected to the same temperature level and current amplitude, wherein the magnetic layer comprises alloy material which has a different permeability versus temperature characteristic at different areas along the currett path.

9. A device for regulating the temperature of a fluid under pressure flowing along a path, the device comprising:
 a layer of thermally conductive, porous magnetic material having a defined termperature T vs $\mu$ permeability characteristic wherein the permeability of the magnetic material is inversely related to temperature over a aange of temperatures;
 the fluid passing through the pores in a magnetic layer,
 wherein the thermally conductive layer comprises a conical magnetic layer the axis of which is at least substantially aligned with the flow path of the fluid,
 a second thermally conductive, porous conical layer in contact with and coaxial with said first mentioned layer,
 wherein said second conical layer is electrically conductive and disposed around said first mentioned layer;
 wherein the a.c. applying means has a ground return path whereby a.c. current flows (a) along the inner conical surface of said layer of porous magnetic material atttemperatures below a predefined level and (b) spreads into said second conical layer at temperatures above a predefined level,
 a third conical layer;
 wherein the third conical layer comprises a porous magnetic material having a different $\mu$ versus T characteristic than the first mentioned layer;
 the second layer being (a) sandwiched between the first mentioned layer and third layer and (b) in thermal and electrical contact therewith; and
 wherein the a.c. applying means further comprises:
 means for selectively directing a.c. current along either the inner surface of the first meantioned layer or the outer surface of the third layer, the a.c. current spreading into the second layer (a) from the first mentioned layer at temperatures about a first level when a.c. current is directed therethrough and (b) from the second layer at temperatures above a second level when a.c. current is directed therethrough.

10. A device as in claim 9 wherein at least one of said second temperature levels is high enough to free pores in the layers of contaminants thereon.

* * * * *